United States Patent
Pietila

(10) Patent No.: US 12,206,694 B2
(45) Date of Patent: Jan. 21, 2025

(54) CYBERATTACK IDENTIFICATION IN A NETWORK ENVIRONMENT

(71) Applicant: Telefonaktiebolaget LM Ericsson (publ), Stockholm (SE)

(72) Inventor: Harri Pietila, Marttila (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 207 days.

(21) Appl. No.: 17/802,578

(22) PCT Filed: Feb. 28, 2020

(86) PCT No.: PCT/EP2020/055293
§ 371 (c)(1),
(2) Date: Aug. 26, 2022

(87) PCT Pub. No.: WO2021/170249
PCT Pub. Date: Sep. 2, 2021

(65) Prior Publication Data
US 2023/0087309 A1    Mar. 23, 2023

(51) Int. Cl.
*H04L 9/40*    (2022.01)
(52) U.S. Cl.
CPC ...... *H04L 63/1425* (2013.01); *H04L 63/1416* (2013.01)
(58) Field of Classification Search
None
See application file for complete search history.

(56) References Cited

U.S. PATENT DOCUMENTS

| | | | |
|---|---|---|---|
| 2007/0300300 A1 | 12/2007 | Guo et al. | |
| 2009/0089869 A1* | 4/2009 | Varghese | G07F 7/1008 726/7 |

(Continued)

OTHER PUBLICATIONS

International Search Report and the Written Opinion of the International Searching Authority, issued in corresponding International Application No. PCT/EP2020/055293, dated Oct. 5, 2020, 13 pages.

(Continued)

*Primary Examiner* — Anh Nguyen
(74) *Attorney, Agent, or Firm* — Rothwell, Figg, Ernst & Manbeck, P.C.

(57) ABSTRACT

There is provided mechanisms for cyberattack identification in a network environment. A method is performed by a security analytics module. The method comprises obtaining logged events. The events having occurred and are logged in the network environment. Each logged event is associated with a cyber security deviation score and cyber security deviation statistics. The method comprises matching each logged event to a cyber-attack lifecycle phase by comparing characteristics of each logged event, as given by the cyber security deviation statistics, to known cyberattack lifecycle phases. The method comprises linking together the logged events by forming at least one chain of the logged events. Each chain corresponds to one type of cyberattack as given by combinations of the known cyberattack lifecycle phases. The cyber security deviation scores and cyber security deviation statistics are updated based on how the logged events are linked together. The method comprises determining, based on how the logged events are linked together and the cyber security deviation scores and the cyber security deviation statistics as updated, whether the logged events are benign or part of a cyberattack.

19 Claims, 4 Drawing Sheets

(56) References Cited

U.S. PATENT DOCUMENTS

2017/0063917 A1    3/2017  Chesla
2018/0123864 A1*   5/2018  Tucker ................ H04L 41/0613
2019/0342307 A1*  11/2019  Gamble .............. G06F 16/9024

OTHER PUBLICATIONS

Lockheed Martin "Gaining the Advantage, Applying Cyber Kill Chain® Methodology to Network Defense" 2015, 13 pages.
Strom et al. "Mitre Technical Report, Finding Cyber Threats with ATT&CK™-Based Analytics" The MITRE Corporation, Jun. 2017, 53 pages.
MITRE "Cybersecurity Threat-Based Defense" 2015, 3 pages.

* cited by examiner

CYBERATTACK IDENTIFICATION IN A NETWORK ENVIRONMENT

CROSS REFERENCE TO RELATED APPLICATION(S)

This application is a 35 U.S.C. § 371 National Phase Entry Application from PCT/EP2020/055293, filed Feb. 28, 2020, designating the United States, the disclosure of which is incorporated herein by reference in its entirety.

TECHNICAL FIELD

Embodiments presented herein relate to a method, a security analytics module, a computer program, and a computer program product for cyberattack identification in a network environment.

BACKGROUND

Cybersecurity systems ingest logs, events, flows, and many other various formats of data to produce alerts, alarms, notifications for Security Operations Center (SOC) analysts to triage, sort, analyze and correlate.

This data is produced in immense quantities, even several trillion events per day. SOC analysts spend huge amounts of time screening alarms and alerts for false positives and pass relevant ones for further analysis by the next level. Security Information and Event Management (SIEM) tools can be used to collect events and Security Orchestration, Automation and Response (SOAR) tools can be used to process (and possibly automate) the analysis of the events.

Current log collection engines ingest human readable log events and parse relevant fields from them to their databases, possibly normalized to a standard format. The log events are all developer written information from a human for another human to interpret and is in specific format for the application. The log database data is analyzed by search queries trying to find possible intrusion events. Security analytics solutions are developed to try to find threat events in the big data databases and they produce anomaly scores that try to tell how different events are from others.

A lot of the log and event data itself is ingested in a non-contextually way, for example as a human readable log event that machines do not interpret but collects and parses pieces of information from. The parsed data does not show any relation of the pieces of data in the log event and does not add data or relationships from other events. Once analyzed, data is not typically revisited or if it is revisited it needs a complicated query to analyze relationships with other pieces of data.

Many cybersecurity solutions produce various anomaly scores or similar scores but the interpretation of the events is left to the SOC analyst. Anomaly scores produce a lot of false alarms and require a lot of manual human analyst work to sort them out.

Intrusion detection and prevention solutions do not scale as new different types of malware is created in millions of variants per day and new ways for the bots to communicate are developed constantly. It is not feasible to check every file or packet for millions or even billions of signatures or file hashes.

Hence, there is a need for improved processing of events in network environment for detection of cyberattacks.

SUMMARY

An object of embodiments herein is to provide efficient cyberattack identification in a network environment.

According to a first aspect there is presented a method for cyberattack identification in a network environment. The method is performed by a security analytics module. The method comprises obtaining logged events. The events having occurred and are logged in the network environment. Each logged event is associated with a cyber security deviation score and cyber security deviation statistics. The method comprises matching each logged event to a cyberattack lifecycle phase by comparing characteristics of each logged event, as given by the cyber security deviation statistics, to known cyberattack lifecycle phases. The method comprises linking together the logged events by forming at least one chain of the logged events. Each chain corresponds to one type of cyberattack as given by combinations of the known cyberattack lifecycle phases. The cyber security deviation scores and cyber security deviation statistics are updated based on how the logged events are linked together. The method comprises determining, based on how the logged events are linked together and the cyber security deviation scores and the cyber security deviation statistics as updated, whether the logged events are benign or part of a cyberattack.

According to a second aspect there is presented a security analytics module for cyberattack identification in a network environment. The security analytics module comprises processing circuitry. The processing circuitry is configured to cause the security analytics module to obtain logged events. The events having occurred and are logged in the network environment. Each logged event is associated with a cyber security deviation score and cyber security deviation statistics. The processing circuitry is configured to cause the security analytics module to match each logged event to a cyberattack lifecycle phase by comparing characteristics of each logged event, as given by the cyber security deviation statistics, to known cyberattack lifecycle phases. The processing circuitry is configured to cause the security analytics module to link together the logged events by forming at least one chain of the logged events. Each chain corresponds to one type of cyberattack as given by combinations of the known cyberattack lifecycle phases. The cyber security deviation scores and cyber security deviation statistics are updated based on how the logged events are linked together. The processing circuitry is configured to cause the security analytics module to determine, based on how the logged events are linked together and the cyber security deviation scores and the cyber security deviation statistics as updated, whether the logged events are benign or part of a cyberattack.

According to a third aspect there is presented a security analytics module for cyberattack identification in a network environment. The security analytics module comprises an obtain module configured to obtain logged events. The events having occurred and are logged in the network environment. Each logged event is associated with a cyber security deviation score and cyber security deviation statistics. The security analytics module comprises a match module configured to match each logged event to a cyberattack lifecycle phase by comparing characteristics of each logged event, as given by the cyber security deviation statistics, to known cyberattack lifecycle phases. The security analytics module comprises a link module configured to link together the logged events by forming at least one chain of the logged events. Each chain corresponds to one type of cyberattack as given by combinations of the known cyberattack lifecycle phases. The cyber security deviation scores and cyber security deviation statistics are updated based on how the logged events are linked together. The security analytics module comprises a determine module configured to determine, based on how the logged events are linked together and the cyber security deviation scores and the cyber security deviation statistics as updated, whether the logged events are benign or part of a cyberattack.

According to a fourth aspect there is presented a computer program for cyberattack identification in a network environment, the computer program comprising computer program code which, when run on a security analytics module, causes the security analytics module to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects provide efficient cyberattack identification in a network environment.

Advantageously, these aspects enable processing of events in network environment for detection of cyberattacks.

Advantageously, these aspects enable logged events to be stored in a normalized standardized interpreted format which reduces the need for storage and post-normalization.

Advantageously, these aspects enable efficient event correlation and analysis with early possible interpretation of malicious (or benign) intent.

Advantageously, these aspects enable efficient analysis of cybersecurity events and are suitable for automation with statistical or machine learning technologies.

Advantageously, these aspects enable re-evaluation of initially analyzed logged events as new events are logged.

Advantageously, these aspects enable automatic interpretation of anomaly scores with relevant context and relation to other events.

Advantageously, these aspects enable security status with respect to phase of attack to be identified and possible next steps of an ongoing cyberattack to be predicted to expedite best mitigation actions.

Advantageously, these aspects enable efficient processing of logged events to produce relevant results, produce possibilities for timing and type of attacker's next move and for predicting defending actions.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above there is a need for improved processing of events in network environment for detection of cyberattacks.

In this respect, chains of logged events traditionally need to be manually linked by human ingenuity and possibly be matched to a specific malware or botnet and its modus operandi. Security analytics is traditionally used to improve threat/intrusion detection, but such security analytics are typically poor to analyze the intent and context of logged events and provide little help for interpretation.

The embodiments disclosed herein therefore relate to mechanisms for cyberattack identification in a network environment. In order to obtain such mechanisms there is provided a security analytics module, a method performed by the security analytics module, a computer program product comprising code, for example in the form of a computer program, that when run on a security analytics module, causes the security analytics module to perform the method.

Figure 1:
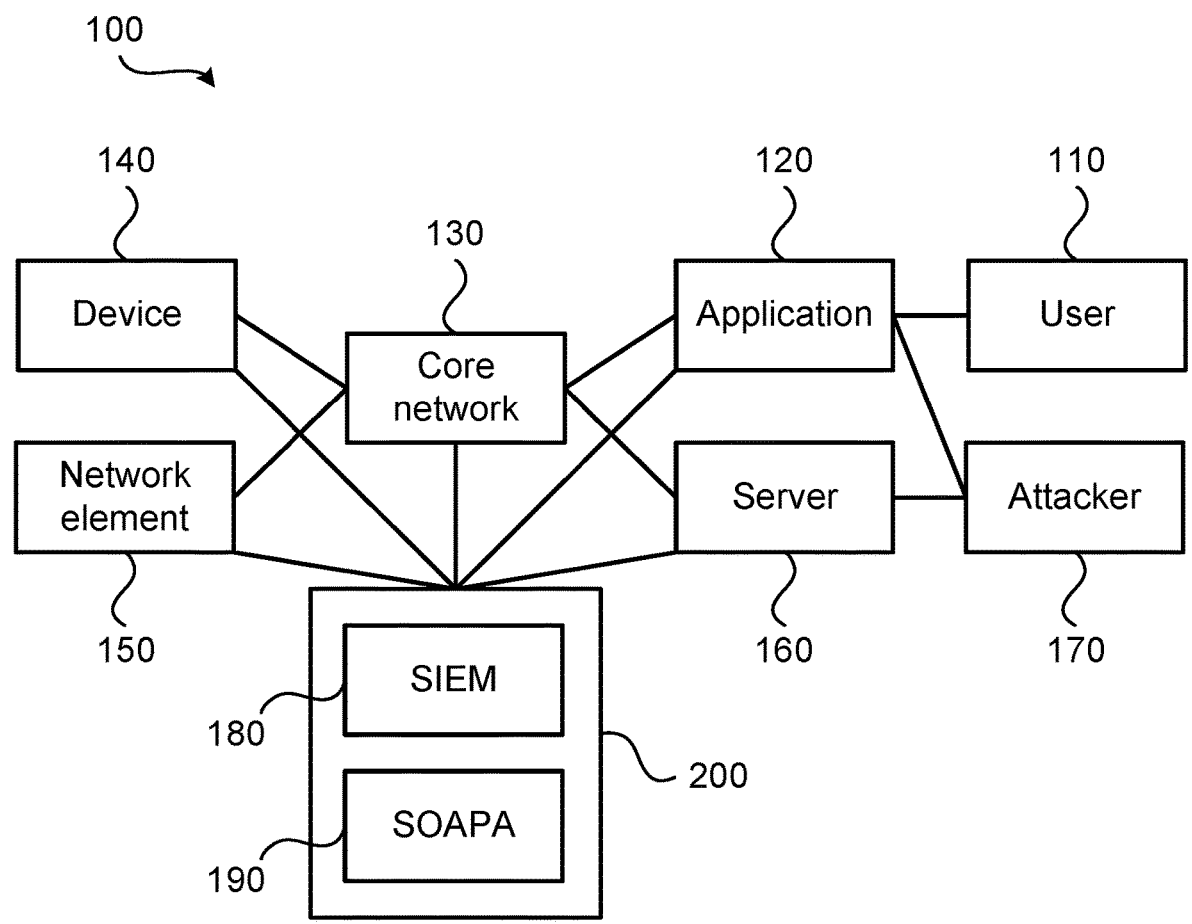
FIG. 1 is a schematic diagram illustrating a network environment according to embodiments.

FIG. 1 is a schematic diagram illustrating a network environment 100 where embodiments presented herein can be applied. The user entity 110 represents a benign user that is the normal user operating the network with benign intent.

The attacker entity 170 represents a malicious user that has a malicious intent to hack the network and use it for malicious purposes.

The application entity 120 represents the the management or application component of the service that the benign user operates. The malicious user might hack into the application entity 120 and gain a compromised account to insert malicious activity through authorized channels.

The server entity 160 represents a server that is in the possession/control of the malicious user and that can be used for malicious actions towards network elements depending on the connectivity architecture. This is typically the command and control server where the malware connects to.

The core network entity 130 represents core network with routers, firewalls, etc. that is the transport network through which the traffic between the network elements travel through.

The device entity 140 represents any number of devices, typically terminal devices, such as Internet of Things (IoT) devices, personal computers, mobile phones, etc. that are connected to the core network entity 130.

The network element entity 150 represents network elements such as radio equipment, operations support system and business support system servers, mobile core elements, and other network elements, that are used for delivering requested service to the user entity 110 and for facilitating communication between the user entity 110 and the device entity 140 via the core network entity 130.

A security analytics module 200 might comprise a Security Information and Event Management (SIEM) system 180 and/or a Security Operations and Analytics Platform Architecture (SOAPA) system 190 and is configured for cyberattack identification in the network environment 100. The security analytics module 200 is configured for collecting logged events from all related entities 120, 130, 140, 150, 160. This part of the security analytics module 200 might be implemented by the SIEM system 180. The security analytics module 200 is configured for analyzing the logged events for cybersecurity related intelligence of malicious activities. This part of the security analytics module 200 might be implemented by the SOAPA system 190. Further aspects of cyberattack identification in the network environment 100 will be disclosed next.

Figure 2:
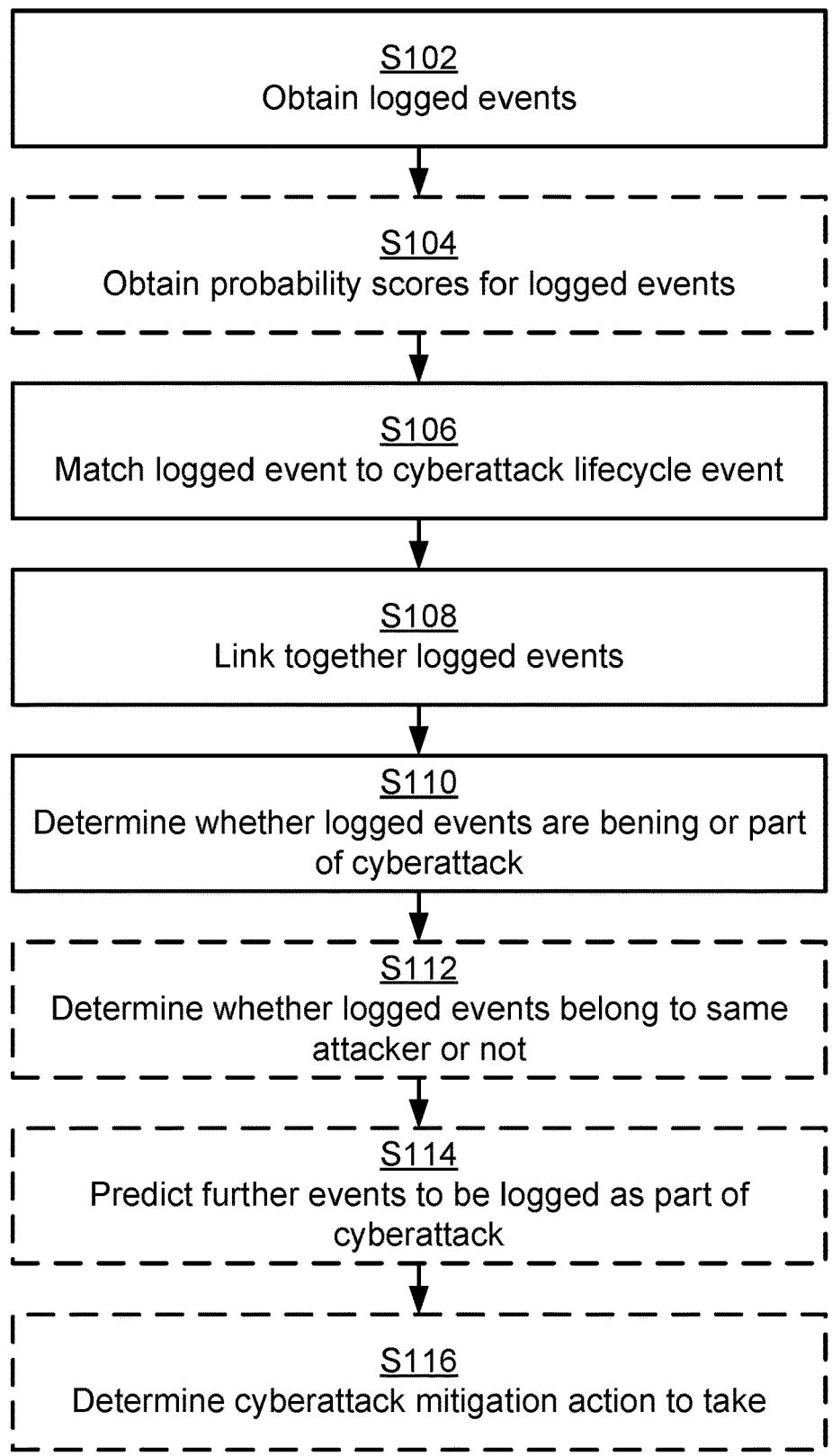
FIG. 2 is a flowchart of methods according to embodiments.

FIG. 2 is a flowchart illustrating embodiments of methods for cyberattack identification in a network environment 100. The methods are performed by the security analytics module 200. The methods are advantageously provided as computer programs 620.

S102: The security analytics module 200 obtains logged events. The events having occurred and are logged in the network environment 100. Each logged event is associated with a cyber security deviation score and cyber security deviation statistics.

S106: The security analytics module 200 matches each logged event to a cyberattack lifecycle phase by comparing characteristics of each logged event, as given by the cyber security deviation statistics, to known cyberattack lifecycle phases.

S108: The security analytics module 200 links together the logged events by forming at least one chain of the logged events. Each chain corresponds to one type of cyberattack as given by combinations of the known cyberattack lifecycle phases. The cyber security deviation scores and cyber security deviation statistics are updated based on how the logged events are linked together. That is, which logged events are linked to which logged events.

S110: The security analytics module 200 determines, based on how the logged events are linked together and the cyber security deviation scores and the cyber security deviation statistics as updated, whether the logged events are benign or part of a cyberattack.

Whether the logged events are benign or part of a cyberattack can be represented by a probability measure.

Embodiments relating to further details of cyberattack identification in a network environment 100 as performed by the security analytics module 200 will now be disclosed.

In general terms, in network environment 100 an attack is any attempt to expose, alter, disable, destroy, steal or gain unauthorized access to or make unauthorized use of an asset. A cyberattack is any type of offensive maneuver that targets network environments 100 such as computer information systems, infrastructures, computer networks, or personal computer devices.

Non-limiting examples of cyberattacks are: WannaCry ransomware, Mirai malware, NotPetya ransomware, and Stuxnet worm.

Aspects of the logged events will now be disclosed. Traditionally, log events are created according to how the event is to be described according to software specifications which means that each software has different way to describe a similar event. In addition, the format of the date, address, and other information might differ. In some embodiments, all logged events are therefore of a uniform machine-readable format. Data of the logged events might thereby be provided in a format that can be used for latter stages of cyberattack identification.

As a non-limiting example, an event pertaining to a login failure could be logged as follows:

Aug 18 00:00:57 izxvps sshd[5657]: Failed password for root from 95.58.255.62 port 38980 ssh2

This event could be converted to a normalized event in a machine readable format in for example the following way:

{"intent":"login", "unix_time":" 1566086457, "dest": "server-a", "port":38980, "service":"ssh", "user": "root", "success":"false"}

As a non-limiting example, for an event pertaining to network flow, network flows might be recorded in format designed by the application but should be converted to a normalized machine readable format:

StartTime Flgs Proto SrcAddr Sport Dir DstAddr Dport TotPkts TotBytes State 17:48:36.592155 e tcp 192.168.0.68.60245->128.2.129.188.http 27 1820 FIN This event could be converted to a normalized event in a machine readable format in for example the following way:

{"intent":"http","unix_time":"1566086457, "target": "128.2.129.188", "port":80, "service": "http","bytes": 1820,"proto": "tcp", "source": "192.168.0.68", "source_port": 60 245, "state":"FIN"}.

Aspects of calculation of the cyber security deviation score and the cyber security deviation statistics will now be disclosed.

The cyber security deviation score might be regarded as an anomaly score, a confidence score, a probability or any score that implies the suspiciousness or maliciousness or security relevant difference of the associated event, especially in relation to other data in the relevant group. In this respect, the cyber security deviation score is an anomaly type of score which provides a measure of how anomalous a logged event is or how much it deviates from a normal event in a cyber security relevant sense. Features/values used for the calculation of the cyber security deviation score are cyber security relevant. The cyber security deviation score can be calculated, for example using a random forest type of algorithm, statistical outliers, autoencoders, etc.

The cyber security deviation score could be calculated from various cyber security relevant features which can then be evaluated for obtaining the statistics. In this respect, the cyber security deviation statistics provide measures of how much the feature values deviate from average, typically in some statistical sense. There is typically not just one feature for which the statistics is calculated. The cyber security deviation statistics might be calculated using ordinary statistics.

The event can be network, host, log or other type of event as not just network events also log events and other events may be suspicious or clearly malicious based on various factors. In some embodiments, the security deviation score for each logged event is proportional to probability of that event is part of the cyberattack. In some embodiments, the security deviation statistics for each logged event is defined as standard deviation of the cyber security deviation score for the same event.

The cyber security deviation score might be calculated in many ways, for example using autoencoders, random forests, and other statistical and machine learning methods. The cyber security deviation score can be scaled in different ways, for example to always take a value in the range 0-100 with 100 being most anomalous. The cyber security deviation statistics of the event represents the deviation from other (normal) events and can be calculated in various ways. One example is to calculate the mean and standard deviation of the group of events under investigation. The cyber security deviation statistics of each feature of the event can be estimated using for example the normalized standard deviation of the feature value from mean. This can be used as the importance of this feature in the interpretation of the cyber security deviation score.

As a non-limiting example, for a cyberattack involving brute force, a login failure might indicate a brute force or password spraying attempt, but it might also be part of a forgotten password scenario. The cyber security deviation score could be calculated using the number of failed logins and possibly also the time between the login attempts. One way to provide this is using the sigmoid function to provide automatic scaling. That is, cyber security deviation score=$100/(1+\exp(-n))$, where n is the number of failed attempts.

As a non-limiting example, numerical features can be used to define normal behavior embeddings for an autoencoder model. The autoencoder can be used to calculate representations and for new events the reconstruction error can be used as the measure of the cyber security deviation score.

As a non-limiting example, the mean and variance of the features can be calculated and the standard deviation can be used to calculate the cyber security deviation statistics. The cyber security deviation statistics can be estimated by how many standard deviations the feature value is from the mean value.

Aspects of how the cyber security deviation score and the cyber security deviation statistics can be used to interpret the logged events in view of known cyberattack lifecycle phases will now be disclosed.

The relevant features of each event is generally dependent on the particular cyberattack lifecycle stage, for example for reconnaissance, network event data such as connection direction, protocol, number of connections and their deviation from others or normal data values could be used to determine the intent behind.

In some embodiments, the comparing in S106 involves selecting the cyberattack lifecycle phase that best matches a combination of event type, cyber security deviation score, and cyber security deviation statistics for each logged event.

As a non-limiting example, for a cyberattack involving malware delivery, if there is a network event that has a cyber security deviation score of 68 and the highest feature deviation according to the cyber security deviation statistics is 9.5 in a data ingest with mean of 1000 bytes and measured value of 275000 bytes, this can be interpreted as an event with an intent to download a malware onto the host computer. It could also be a benign event of software install. Thus, the event is either a malware delivery (malicious intent) or a firmware delivery (benign intent).

As a non-limiting example, for a cyberattack involving a port scan, if the cyber security deviation score is 87 and the highest feature deviation according to the cyber security deviation statistics is 13.2 in number of ports, then this would be a high indication of the intent to scan the ports of the target host computer to find out what services are available and possibly vulnerable. Thus, the event is either a reconnaissance (malicious) or network testing (benign).

Aspects of how to associate the cyber security deviation score and the cyber security deviation statistics with probability values relating to whether a cyberattack is ongoing or not will now be disclosed.

In general terms, the logged events might indicate suspicious or clearly malicious behavior based on various factors and should be evaluated for the probability of being malicious or benign. For example, using network event data such as connection direction, protocol, number of connections, or using failed login attempt log events the intent behind each event might be estimated. In particular, in some embodiments, the security analytics module 200 is configured to perform (optional) step S104:

S104: The security analytics module 200 obtains a probability score for each logged event to be part of the cyberattack. The matching in step S106 is then based on the cyber security deviation statistics for each logged event.

In some embodiments, the probability score per logged event is based on host data, network data, such as connection direction, protocol, number of connections, failed login attempts, associated with that logged event.

As a non-limiting example, for a cyberattack involving brute force, a login failure may indicate a brute force or password spraying attempt, but it may also be just a forgotten password scenario. New events may increase, or decrease, the probability of malicious activity and also increase, or decrease, the possibility of a past event being considered as more malicious. The average count of login attempts could be used to evaluate the maliciousness probability.

As a non-limiting example, for a cyberattack involving malware delivery, the probability increases with the greater deviation of the amount of data from average.

Aspects of flagging logged events as either malicious or benign will now be disclosed.

In general terms, there might be several different intents involved for each event. In some embodiments, each event, based on the probability score for that logged event, is flagged as malicious or benign, and the matching in S106 is dependent on which logged events are flagged as malicious and which logged events are flagged as benign.

Further aspects of how the logged events might be linked together will be disclosed next.

In some embodiments, the logged events are linked together according to an ordered sequence of occurrence of the events. The ordered sequence is given by one combination of the known cyberattack lifecycle phases.

As a non-limiting example, access to a server is required before you a malware can be implanted and an evaluation of which servers are available must be performed before accessing the server and thus the order of events can be used to interpret what type of cyberattack is ongoing.

In some embodiments, this one combination of the known cyberattack lifecycle phases is based on a set of cyberattack lifecycle templates, where each cyberattack lifecycle template comprises its own unique order of occurrence and characteristics of the known cyberattack lifecycle phases.

In some embodiments, during the linking in S108, each logged event is provided with a cyberattack lifecycle phase label.

There are different ways to describe the stages of a cyberattack. In some aspects, there are main stages and substages and the herein disclosed embodiments can be applied to both. For example, a first stage "recon" typically consists of activity that tries to identify any available and possibly vulnerable servers. This stage might be followed by a "weaponization" stage where the malware is developed/ chosen for the target server. The malware is transferred to the target server in a "deliver" stage. In a "control" stage the malicious actor instructs, using various stealthy methods, the malware what actions to take.

As a non-limiting example, the logged events show tries being made to connect to many different ports at the target server. This could show up in aggregated logged events as an anomaly with high probability of malicious activity. Logged events of authorization logs show many failed login attempts. Logged events of network event logs show an anomalous increase in data traffic towards a server (this may or may not be highly anomalous and might be benign and the probability of malicious intent is low or medium). Logged events of network event logs show suspicious connections to the server which may be an indication of "control" stage.

The herein disclosed embodiments can be used to provide a graph between anomalous, suspicious and malicious events where the event has varying degrees of probability of belonging to the malicious graph. The events can be linked together in a graph with edges providing the probability that a given event belongs to a chain of malicious events, compared to belonging to a chain of benign events. The link connection can be based on the server, user, application and other data. Here a graph depicts the actions of a single malicious attacker or a benign user. The purpose is to identify which events belong to which actor.

Further aspects of how the cyber security deviation scores, the cyber security deviation statistics or the probability scores might be updated based on how the logged events are linked together will now be disclosed.

In general terms, the herein disclosed embodiments are based on the understanding that the links between the logged events might change as more information emerges. A previously a probably benign event may turn out to be probably malicious and thus enters the malicious graph.

In some embodiments, the probability score, the cyber security deviation scores and cyber security deviation statistics for each logged event are updated based on which type of other logged events and their probability score, cyber security deviation scores and cyber security deviation statistics that are linked to that logged event.

In some embodiments, the security analytics module 200 is configured to perform (optional) step S112:

S112: The security analytics module 200 determines, based on how the logged events are linked together and the probability score, the cyber security deviation scores and the cyber security deviation statistics as updated, whether the logged events belong to one and the same attacker or not.

A similar determination can be made as with regards to whether the logged events belong to one and the same benign user or not and whether the logged events belong to one and the same attacker or not.

As new events are logged, not just more information about a possible ongoing cyberattack is provided, it provides two directions for intent interpretation; firstly, the probability of malicious intent of past (weakly) linked events that may have been evaluated as most likely benign might be reevaluated, and secondly, from known linked malicious logged events the probability of malicious intent of new logged events could be evaluated.

In the above examples, for a new logged event showing probability of intent interpretation as a "deliver" stage event, two steps can be taken; firstly, the already linked probably malicious events can be used to estimate the intent probabilities of the new logged event, and secondly, the new logged event can be used to re-evaluate the intent probabilities of past linked events, also those with probably benign intent. This could be achieved also using reinforcement learning.

Once the linked events have been identified, and optionally cyber security deviation score and the cyber security deviation statistics for relevant logged events have been updated, the probability that the linked events are part of an ongoing cyberattack can be re-evaluated. Also logged events that were previously not linked to each other might be linked based on the re-evaluated probability values, and optionally cyber security deviation scores and cyber security deviation statistics.

Further aspects of whether the logged events are benign or part of a cyberattack will now be disclosed.

Statistical methods can be used to predict which further events that are likely to be logged for a certain ongoing cyberattack. In particular, in some embodiments, the security analytics module 200 is configured to perform (optional) step S114:

S114: The security analytics module 200 predicts, based on how the logged events are linked together and the probability scores, the cyber security deviation scores and the cyber security deviation statistics as possibly updated, further events to be logged as part of the cyberattack.

Such information can be used to determine suitable counteractions to mitigate the cyberattack. In particular, in some embodiments, the security analytics module 200 is configured to perform (optional) step S116:

S116: The security analytics module 200 determines, based on which events that have been predicted to be logged as part of the cyberattack, at least one cyberattack mitigation action to take.

In further aspects, as part of the linking of events and the re-evaluation of intent probabilities, a template of known cyberattack lifecycle phases could be used. But as the details of the ongoing cyberattack emerge with the resulting graph, scores, probabilities, deviations, statistics and other data, this will generate a signature of the cyberattack. The signature comprises the graph where each vertex represents one logged event, and where each edge represents a probability value. Other data such as scores, statistics, time difference of the events could be added into the graph. The signature of the cyberattack can be turned into a vector that can be compared with other signatures for closeness and grouping. If the signature is far from other signatures, this is an indication of a new type of cyberattack. Therefore, in some embodiments, when there is no exact match between the combination of the known cyberattack lifecycle phases and any of the cyberattack lifecycle templates, the cyberattack is identified as a new type of cyberattack.

In further aspects, the logged events might be stored in a database and be made searchable. This enables the logged events to be searched based on specific intent as part of incident response or threat hunting.

In further aspects, a visualization of the logged events as linked might be provided to a user interface, such as in time graphs with labels or as icons. The scores, statistics, and/or probability values could be used for determining colors of the labels, thus providing a dynamic colorization of the labels as the scores, statistics, and/or probability values are updated.

Figure 3:
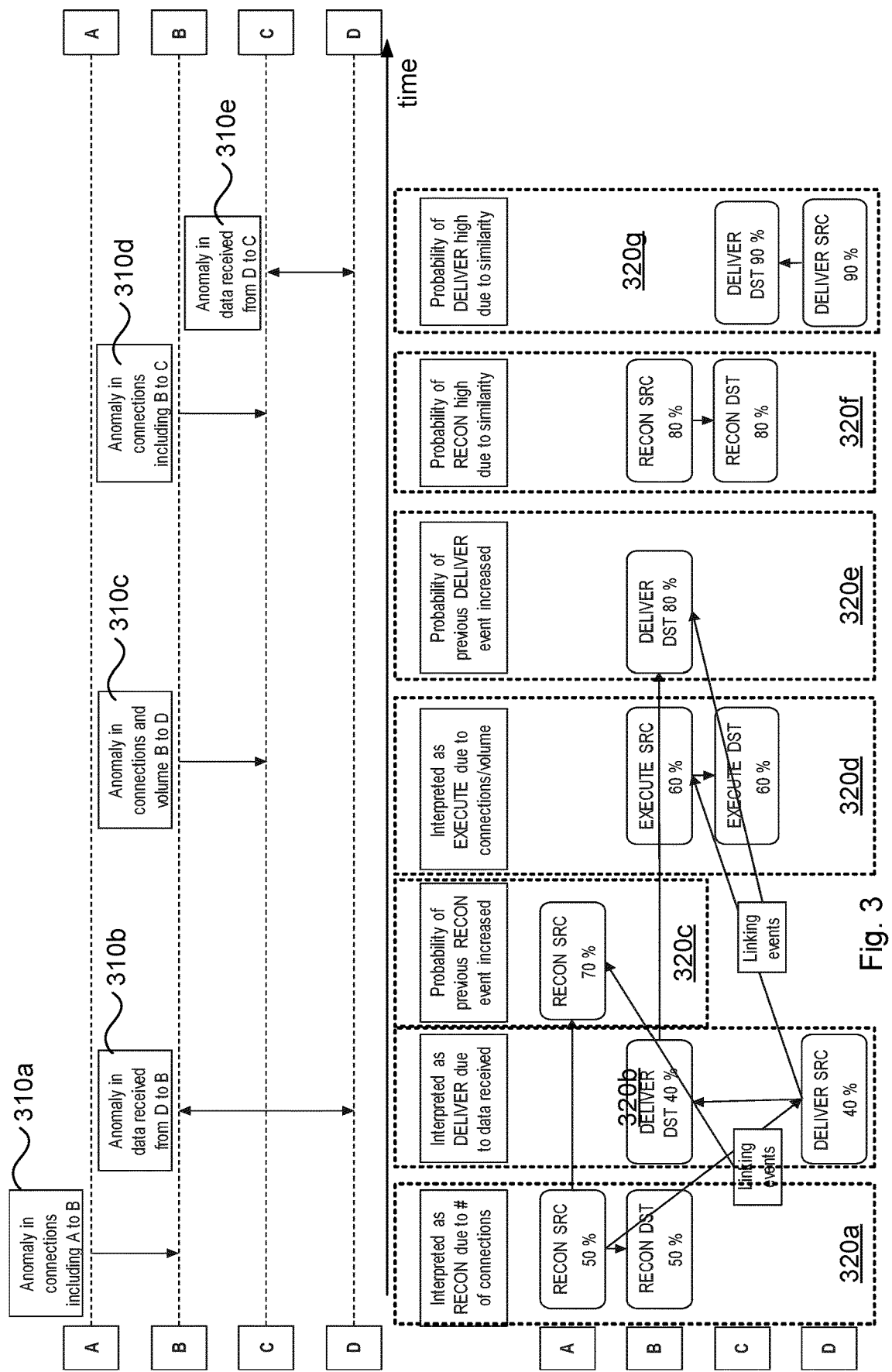
FIG. 3 schematically illustrates events occurring and being logged along a timeline according to an embodiment.

FIG. 3 schematically illustrates four host computers A, B, C, D and events 310a, 310b, 310c, 310d, 310e occurring and being logged along a timeline. FIG. 3 further illustrates how probability values are evaluated and adjusted as time progresses. The first 310a event is at 320a evaluated as a "DELIVER" event with a specific source and destination and probability value due to characteristics of many connections, the event could alternatively be benign. The second event 310b is at 320b evaluated as a "DELIVER" event due to data received, but it could alternatively be a benign event. But as the host computer B is the same for both events 310a, 310b, this information can be used to link both events via a malware modus operandi. The probability values of both events to be malicious is therefore at 320c increased. The third event 310c is at 320d evaluated as an "EXECUTE" event and is linked to the same host computer B. The probability value of the "DELIVER" event is therefore at 320e further increased again via the linking of host computer and the malware modus operandi. If a fourth event 310d similar to the first event 310a is logged, the fourth event 310d is at 320f instantly given a high probability of being malicious due to previous linked events and increased probabilities. Likewise, if a fifth event 310e similar to the second event 310b is logged, the fifth event 310e is at 320g instantly given a high probability of being malicious due to previous linked events and increased probabilities.

Figure 4:
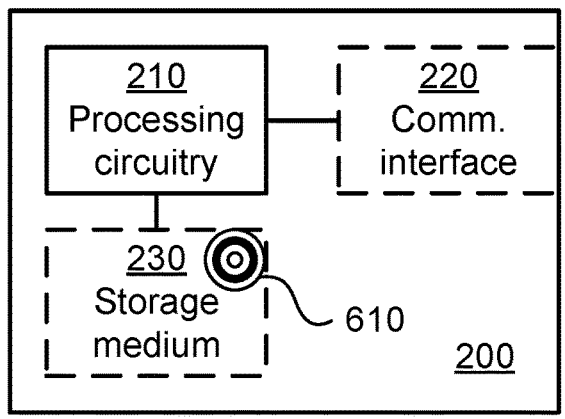
FIG. 4 is a schematic diagram showing functional units of a security analytics module according to an embodiment.

FIG. 4 schematically illustrates, in terms of a number of functional units, the components of a security analytics module 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 610 (as in FIG. 6), e.g. in the form of a storage medium 230. The processing circuitry 210 may further be provided as at least one application specific integrated circuit (ASIC), or field programmable gate array (FPGA).

Particularly, the processing circuitry 210 is configured to cause the security analytics module 200 to perform a set of operations, or steps, as disclosed above. For example, the storage medium 230 may store the set of operations, and the processing circuitry 210 may be configured to retrieve the set of operations from the storage medium 230 to cause the security analytics module 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The security analytics module 200 may further comprise a communications interface 220 at least configured for communications with other functions, nodes, entities, modules, and devices of the network environment 100. As such the communications interface 220 may comprise one or more transmitters and receivers, comprising analogue and digital components. The processing circuitry 210 controls the general operation of the security analytics module 200 e.g. by sending data and control signals to the communications interface 220 and the storage medium 230, by receiving data and reports from the communications interface 220, and by retrieving data and instructions from the storage medium 230. Other components, as well as the related functionality, of the security analytics module 200 are omitted in order not to obscure the concepts presented herein.

Figure 5:
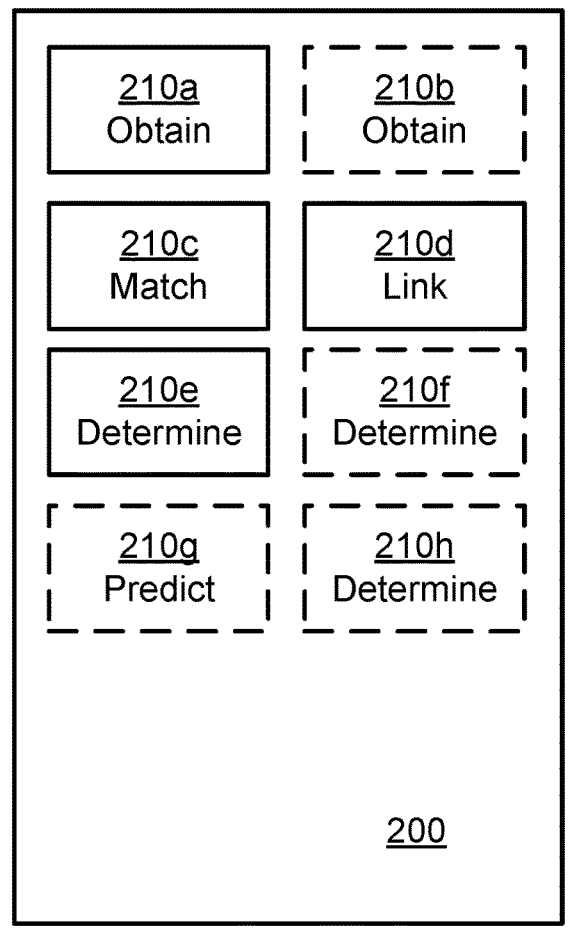
FIG. 5 is a schematic diagram showing functional modules of a security analytics module according to an embodiment.

FIG. 5 schematically illustrates, in terms of a number of functional modules, the components of a security analytics module 200 according to an embodiment. The security analytics module 200 of FIG. 5 comprises a number of functional modules; an obtain module 210a configured to perform step S102, a match module 210C configured to perform step S106, a link module 210d configured to perform step S108, and a determine module 210e configured to perform step S110. The security analytics module 200 of FIG. 5 may further comprise a number of optional functional modules, such as any of an obtain module 210b configured to perform step S104, a determine module 210f configured to perform step S112, a predict module 210g configured to perform step S114, and a determine module 210h configured to perform step S116.

In general terms, each functional module 210a-210h may in one embodiment be implemented only in hardware and in another embodiment with the help of software, i.e., the latter embodiment having computer program instructions stored on the storage medium 230 which when run on the processing circuitry makes the security analytics module 200 perform the corresponding steps mentioned above in conjunction with FIG. 5. It should also be mentioned that even though the modules correspond to parts of a computer program, they do not need to be separate modules therein, but the way in which they are implemented in software is dependent on the programming language used. Preferably, one or more or all functional modules 210a-210h may be implemented by the processing circuitry 210, possibly in cooperation with the communications interface 220 and/or the storage medium 230. The processing circuitry 210 may thus be configured to from the storage medium 230 fetch instructions as provided by a functional module 210a-210h and to execute these instructions, thereby performing any steps as disclosed herein.

The security analytics module 200 may be provided as a standalone device or as a part of at least one further device. For example, the security analytics module 200 may be provided as part of a SIEM module 180 and/or a SOAPA module 190, or comprise a SIEM module 180 and/or a SOAPA module 190. Alternatively, functionality of the security analytics module 200 may be distributed between at least two devices, or nodes. These at least two nodes, or devices, may either be part of the same network part or may be spread between at least two such network parts. Thus, a first portion of the instructions performed by the security analytics module 200 may be executed in a first device, and a second portion of the of the instructions performed by the security analytics module 200 may be executed in a second device; the herein disclosed embodiments are not limited to any particular number of devices on which the instructions performed by the security analytics module 200 may be executed. Hence, the methods according to the herein disclosed embodiments are suitable to be performed by a security analytics module 200 residing in a cloud computational environment. Therefore, although a single processing circuitry 210 is illustrated in FIG. 4 the processing circuitry 210 may be distributed among a plurality of devices, or nodes. The same applies to the functional modules 210a-210h of FIG. 5 and the computer program 620 of FIG. 6.

Figure 6:
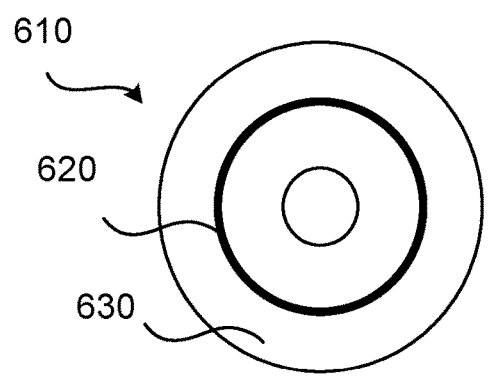
FIG. 6 shows one example of a computer program product comprising computer readable storage medium according to an embodiment.

FIG. 6 shows one example of a computer program product 610 comprising computer readable storage medium 630. On this computer readable storage medium 630, a computer program 620 can be stored, which computer program 620 can cause the processing circuitry 210 and thereto operatively coupled entities and devices, such as the communications interface 220 and the storage medium 230, to execute methods according to embodiments described herein. The computer program 620 and/or computer program product 610 may thus provide means for performing any steps as herein disclosed.

In the example of FIG. 6, the computer program product 610 is illustrated as an optical disc, such as a CD (compact disc) or a DVD (digital versatile disc) or a Blu-Ray disc. The computer program product 610 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 620 is here schematically shown as a track on the depicted optical disk, the computer program 620 can be stored in any way which is suitable for the computer program product 610.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for cyberattack identification in a network environment, the method being performed by a security analytics module, the method comprising:
obtaining logged events, the events having occurred and being logged in the network environment, wherein each logged event is associated with a cyber security deviation score and cyber security deviation statistics;
matching each logged event to a cyberattack lifecycle phase by comparing characteristics of each logged event, as given by the cyber security deviation statistics, to known cyberattack lifecycle phases;
linking together the logged events by forming at least one chain of the logged events where each vertex represents one logged event and where each edge represents a probability value, wherein each chain corresponds to one type of cyberattack as given by combinations of the known cyberattack lifecycle phases, wherein the cyber security deviation scores and cyber security deviation statistics are updated based on how the logged events are linked together; and
determining, based on how the logged events are linked together and the cyber security deviation scores and the cyber security deviation statistics are updated, whether the logged events are benign or part of a cyberattack, wherein the security deviation statistics for each logged event is defined as standard deviation of the cyber security deviation score for the same event.

2. The method according to claim 1, wherein all logged events are of a uniform machine-readable format.

3. The method according to claim 1, wherein the security deviation score for each logged event is proportional to a probability of that event being part of the cyberattack.

4. The method according to claim 1, wherein said comparing involves selecting the cyberattack lifecycle phase that best matches a combination of event type, cyber security deviation score, and cyber security deviation statistics for each logged event.

5. The method according to claim 1, further comprising:
obtaining a probability score for each logged event to be part of the cyberattack, and wherein said matching is based on the cyber security deviation statistics for each logged event.

6. The method according to claim 5, wherein the probability score per logged event is based on one or more of host data, network data, connection direction, protocol, number of connections, and failed login attempts, associated with that logged event.

7. The method according to claim 5, wherein each event, based on the probability score for that logged event, is flagged as malicious or benign, and wherein said matching is dependent on which logged events are flagged as malicious and which logged events are flagged as benign.

8. The method according to claim 1, wherein the logged events are linked together according to an ordered sequence of occurrence of the events, and wherein the ordered sequence is given by one combination of the known cyberattack lifecycle phases.

9. The method according to claim 8, wherein said one combination of the known cyberattack lifecycle phases is based on a set of cyberattack lifecycle templates, where each cyberattack lifecycle template comprises its own unique order of occurrence and characteristics of the known cyberattack lifecycle phases.

10. The method according to claim 1, wherein, during said linking, each logged event is provided with a cyberattack lifecycle label.

11. The method according to claim 5, wherein the probability score, the cyber security deviation scores and cyber security deviation statistics for each logged event are updated based on which type of other logged events and their cyber security deviation scores and cyber security deviation statistics that are linked to that logged event.

12. The method according to claim 11, further comprising:
determining, based on how the logged events are linked together and the probability score and the cyber security deviation scores and the cyber security deviation statistics as updated, whether the logged events belong to one and the same attacker or not.

13. The method according to claim 1, further comprising:
predicting, based on how the logged events are linked together and the cyber security deviation scores and the cyber security deviation statistics as updated, further events to be logged as part of the cyberattack.

14. The method according to claim 13, further comprising:
determining, based on which events that have been predicted to be logged as part of the cyberattack, at least one cyberattack mitigation action to take.

15. The method according to claim 9, wherein, when there is no exact match between the combination of the known cyberattack lifecycle phases and any of the cyberattack lifecycle templates, the cyberattack is identified as a new type of cyberattack.

16. A security analytics module for cyberattack identification in a network environment, the security analytics module comprising processing circuitry, the processing circuitry being configured to cause the security analytics module to:
obtain logged events, the events having occurred and being logged in the network environment, wherein each logged event is associated with a cyber security deviation score and cyber security deviation statistics;
match each logged event to a cyberattack lifecycle phase by comparing characteristics of each logged event, as given by the cyber security deviation statistics, to known cyberattack lifecycle phases;
link together the logged events by forming at least one chain of the logged events where each vertex represents one logged event and where each edge represents a probability value, wherein each chain corresponds to one type of cyberattack as given by combinations of the known cyberattack lifecycle phases, wherein the cyber security deviation scores and cyber security deviation statistics are updated based on how the logged events are linked together; and determine, based on how the logged events are linked together and the cyber security deviation scores and the cyber security deviation statistics are updated, whether the logged events are benign or part of a cyberattack, wherein the security deviation statistics for each logged event is defined as standard deviation of the cyber security deviation score for the same event.

17. The security analytics module according to claim 16, further being configured to obtain a probability score for each logged event to be part of the cyberattack, and wherein said matching is based on the cyber security deviation statistics for each logged event.

18. A computer program product comprising a computer program for cyberattack identification in a network environment, and a non-transitory computer readable storage medium on which the computer program is stored, and where the computer program comprises computer code which, when run on processing circuitry of a security analytics module, causes the security analytics module to:

obtain logged events, the events having occurred and being logged in the network environment, wherein each logged event is associated with a cyber security deviation score and cyber security deviation statistics;

match each logged event to a cyberattack lifecycle phase by comparing characteristics of each logged event, as given by the cyber security deviation statistics, to known cyberattack lifecycle phases;

link together the logged events by forming at least one chain of the logged events where each vertex represents one logged event and where each edge represents a probability value, wherein each chain corresponds to one type of cyberattack as given by combinations of the known cyberattack lifecycle phases, wherein the cyber security deviation scores and cyber security deviation statistics are updated based on how the logged events are linked together; and determine, based on how the logged events are linked together and the cyber security deviation scores and the cyber security deviation statistics are updated, whether the logged events are benign or part of a cyberattack, wherein the security deviation statistics for each logged event is defined as standard deviation of the cyber security deviation score for the same event.

19. The security analytics module according to claim 16, being configured to predict, based on how the logged events are linked together and the cyber security deviation scores and the cyber security deviation statistics as updated, further events to be logged as part of the cyberattack.

* * * * *